United States Patent
Ott et al.

(10) Patent No.: US 11,525,727 B2
(45) Date of Patent: Dec. 13, 2022

(54) DEVICE AND METHOD FOR CONTROLLING AN OPTICAL RECOGNITION UNIT WITH THE HELP OF A CAPACITIVE FILLING LEVEL MEASUREMENT IN LIQUID CONTAINERS

(71) Applicant: TECAN TRADING AG, Mannedorf (CH)

(72) Inventors: Philipp Ott, Steg (CH); Luca Frei, Jona (CH); Pascal Dieterich, Jona (CH)

(73) Assignee: TECAN TRADING AG, Mannedorf (CH)

( * ) Notice: Subject to any disclaimer, the term of this patent is extended or adjusted under 35 U.S.C. 154(b) by 7 days.

(21) Appl. No.: 17/258,596

(22) PCT Filed: Jul. 9, 2019

(86) PCT No.: PCT/EP2019/068383
§ 371 (c)(1),
(2) Date: Jan. 7, 2021

(87) PCT Pub. No.: WO2020/011744
PCT Pub. Date: Jan. 16, 2020

(65) Prior Publication Data
US 2021/0164824 A1    Jun. 3, 2021

(30) Foreign Application Priority Data

Jul. 13, 2018 (EP) .................................... 18183382

(51) Int. Cl.
*G01F 23/26* (2022.01)
*G01F 23/263* (2022.01)

(52) U.S. Cl.
CPC .......... *G01F 23/266* (2013.01); *G01F 23/265* (2013.01)

(58) Field of Classification Search
CPC ...... G01F 23/266; G01F 23/265; G01F 23/268
See application file for complete search history.

(56) References Cited

U.S. PATENT DOCUMENTS

| 7,509,856 B1 | 3/2009 | Winkens |
| 7,836,762 B2 | 11/2010 | Gamberini et al. |
| (Continued) | | |

FOREIGN PATENT DOCUMENTS

| DE | 102013005963 A1 | 10/2014 |
| DE | 202015101687 U1 | 7/2016 |
| (Continued) | | |

OTHER PUBLICATIONS

International Search Report for corresponding PCT application No. PCT/EP2019/068383, dated Sep. 13, 2019.

(Continued)

*Primary Examiner* — Francis C Gray
(74) *Attorney, Agent, or Firm* — Notaro, Michalos & Zaccaria P.C.

(57) ABSTRACT

A device for controlling an optical recognition unit with the help of a capacitive filling level measurement in liquid containers having a sensor with a measuring electrode, a conductive base plate suitable for arranging at least one liquid container or a carrier unit having at least one receptacle for receiving a liquid container, a sensor electronics unit that is connected to the measuring electrode and the base plate adapted to determine a capacitance between the measuring electrode and base plate, an evaluation unit, and a control unit for controlling the optical recognition unit, is disclosed.

19 Claims, 5 Drawing Sheets

(56) References Cited

U.S. PATENT DOCUMENTS

| | | | | |
|---|---|---|---|---|
| 8,931,340 B2* | 1/2015 | Wiederkind-Klein | | G01F 23/268 73/304 C |
| 10,576,748 B2* | 3/2020 | Ge | | B41J 2/195 |
| 2016/0356737 A1* | 12/2016 | Schoeni | | G01F 23/266 |
| 2018/0328876 A1* | 11/2018 | Gradl | | G01F 23/268 |
| 2019/0126631 A1* | 5/2019 | Anderson | | B41J 2/17546 |

FOREIGN PATENT DOCUMENTS

| | | |
|---|---|---|
| EP | 2977730 A1 | 1/2016 |
| WO | 2006021295 A1 | 3/2006 |

OTHER PUBLICATIONS

International Preliminary Report on Patentability and Written Opinion for corresponding PCT application No. PCT/EP2019/068383, dated Jan. 19, 2021.

* cited by examiner

DEVICE AND METHOD FOR CONTROLLING AN OPTICAL RECOGNITION UNIT WITH THE HELP OF A CAPACITIVE FILLING LEVEL MEASUREMENT IN LIQUID CONTAINERS

TECHNICAL FIELD OF THE INVENTION

The present invention belongs to the technical field of automated laboratory systems or equipment, such as medical, chemical, pharmaceutical or forensic analysis devices, and specifically relates to liquid processing systems, in particular a device and a corresponding method for controlling an optical recognition unit with the help of a capacitive filling level measurement in liquid containers.

BACKGROUND OF THE INVENTION

Whenever large quantities of samples have to be examined in medical, chemical, analytical, pharmaceutical or forensic laboratories, automated laboratory systems or equipment are usually used today, which enable each individual sample to be processed quickly and reliably. Such laboratory systems are often designed as liquid processing systems to handle liquid volumes. Usually, one or more robots are used for the fully automated operation of such laboratory systems. These robots are particularly specialized in handling liquid containers and are therefore referred to as "liquid handling robots" in technical jargon. The samples are usually delivered in sample containers, such as sample tubes, several of which are arranged in a carrier unit (also called "rack" in technical jargon). In addition, reagents, which are added to the samples in the course of sample processing, are often provided in vessels such as vials or troughs.

Sample tubes and reagent vessels typically have varying levels or are sometimes empty when they are prepared for processing by the liquid processing system. To ensure fast and efficient processing, the filling level of each liquid container should be known before the robot starts working. In particular, empty containers should be identified, and the system should also be able to detect if there is a sample tube in a particular carrier unit receptacle, what type of sample tube is in a particular carrier unit receptacle, or what type of carrier unit it is. It can also be helpful to recognize certain features of a carrier unit.

Therefore, there is a need for means that allow easy (and therefore cost-effective) and reliable determination of the above-mentioned features in automated liquid processing systems, thus enabling more efficient processing of large quantities of samples.

Often, an optical recognition unit is used to recognize identifiers on and/or characteristics of laboratory objects (such as carrier units, liquid containers, troughs, sample tubes, etc.) and/or samples (liquids) contained therein. In order to be able to recognize the identifiers and characteristics as easily, quickly and reliably as possible, and in particular to keep the amount of data that must be processed for this purpose as low as possible, there is a need for suitable means to control the optical recognition unit.

SUMMARY OF THE INVENTION

It is an object of the present invention to provide a device for controlling an optical recognition unit as well as for measuring the filling level in liquid containers, with the help of which it is possible to precisely detect the filling level of the individual liquid containers already when they are provided for the subsequent processing by the liquid handling robot, and which ensures a simple, quick and reliable recognition of identifiers on and/or characteristics of laboratory objects and/or samples contained therein. This object is fulfilled by the measurement device specified in claim 1.

In addition, it is an object of the present invention to provide a corresponding method for controlling an optical recognition unit as well as for measuring the filling level in liquid containers, with the help of which it is possible to precisely detect the filling level of the individual liquid containers already when they are provided for the subsequent processing by the liquid handling robot, and which ensures a simple, quick and reliable recognition of identifiers on and/or characteristics of laboratory objects and/or samples contained therein. According to the invention, this object is solved by the measurement method proposed in claim 12.

Specific embodiments according to the invention are given in the dependent claims.

A device according to the invention for controlling an optical recognition unit with the help of a capacitive filling level measurement in liquid containers, in particular containers (such as troughs or vials) for reagents or sample tubes, comprises:

- the optical recognition unit with an optical sensor element;
- a sensor having a measurement electrode;
- a conductive base plate suitable for arranging at least one liquid container or a carrier unit having at least one receptacle for receiving a liquid container, in particular a sample tube;
- a sensor electronic unit which is connected to the measurement electrode and the base plate and is adapted to determine a capacitance (or impedance) between the measurement electrode and the base plate;
- an evaluation unit; and
- a control unit for controlling the optical recognition unit, wherein the measurement electrode is arranged substantially perpendicularly to the base plate, in particular is arranged vertically to the horizontally arranged base plate, and wherein the evaluation unit is adapted to determine, based on the capacitance, at least one from the following list:

- a filling level of the liquid container, in particular of the sample tube, in particular whether the liquid container, in particular the sample tube, is empty and/or exceeds or is below a predetermined filling level;
- whether a liquid container, in particular a sample tube, is present in the at least one receptacle;
- different carrier units, such as carrier units for differently sized liquid containers, in particular sample tubes;
- different characteristics on a carrier unit, such as individual receptacles, in particular partitions between the receptacles, and wherein the control unit is connected to the sensor electronics unit or the evaluation unit, and a control signal can be generated by the sensor electronics unit or the evaluation unit depending on the capacitance, and the optical recognition unit is controllable depending on the control signal, in particular a process can be activated for recognizing identifiers on and/or characteristics of the liquid container, in particular a sample tube, and/or of a reagent or sample contained therein.

In an embodiment of the device, the measurement electrode is arranged on the front side of a sensor carrier above a guard electrode, wherein the guard electrode is in particular located between the measurement electrode and the base plate.

In another embodiment of the device, the measurement electrode is arranged on a front side of a sensor carrier between a first and a second guard electrode.

In another embodiment of the device, a third guard electrode is arranged on a rear side or an intermediate layer of the sensor carrier, wherein the third guard electrode (is electrically insulated from the measurement electrode and the first and second guard electrodes and) covers at least the measurement electrode (from behind), in particular covers the measurement electrode and the first and second guard electrodes.

In another embodiment of the device, the measurement electrode and the first and second guard electrode are arranged between a first and a second ground electrode, wherein the first and second ground electrode are in turn arranged between a fourth and fifth guard electrode, wherein the first and second ground electrode are electrically connected to the base plate.

In another embodiment of the device, the measurement electrode, the possible guard electrodes and the possible ground electrodes are designed in the form of strips and are aligned vertically and in particular parallel to a longitudinal axis of the liquid container, in particular of the sample tube, during operation of the device.

In another embodiment of the device, the measurement electrode has a width in the range from 80% to 100% of the diameter of the liquid container, in particular the sample tube, and the first and second guard electrode in particular each have a width of over 100% of the diameter of the liquid container, in particular the sample tube. The sample tubes are typically between 8 and 16 mm wide.

In another embodiment of the device, the sensor electronics unit comprises a signal generator with which a signal for exciting the measuring electrode can be generated, wherein the signal is in particular a sinusoidal signal with a frequency in the range from 20 kHz to 400 kHz or a stairstep-shaped signal with a frequency in the range from 20 kHz to 50 kHz, wherein the frequency is in particular adjustable to different values. It is to be noted, that the signal does not have to contain signal components only (exactly) at the mentioned frequency, but apart from this frequency may comprise additional signal components at other frequencies in a frequency range around the mentioned frequency. To detect foam or to distinguish between different liquids, in particular reagents, having different impedance spectra (as both provided in the following) also signals with a frequency of several megahertz, e.g. of 12 MHz, are employed.

In another embodiment of the device, the signal for exciting the measurement electrode is also used for exciting the guard electrodes, wherein the signal for exciting the guard electrodes is of low impedance, and can in particular be generated from the signal for exciting the measurement electrode with a buffer amplifier with voltage gain 1.

In another embodiment of the device, the sensor carrier is designed as a printed circuit board, in particular as a multi-layer printed circuit board.

In another embodiment of the device, the sensor electronic unit is located on the same printed circuit board as the sensor, wherein the printed circuit board has at least two intermediate layers between the front side and the rear side, wherein the measurement electrode and the possible first and second guard electrode as well as the possible first and second ground electrode as well as the possible fourth and fifth guard electrode are located on the front side of the printed circuit board, the possible third guard electrode is located on a first intermediate layer behind the front side, a ground surface as a shield is located on a second intermediate layer behind the first intermediate layer, wherein the shield is electrically connected to the possible first and second ground electrode, and conductor tracks for signal conduction of the sensor electronic unit are located on the rear side and possibly one or more further intermediate layers between the rear side and the ground surface.

According to another aspect of the present invention, a method for controlling an optical recognition unit with the help of a capacitive filling level measurement in liquid containers, in particular containers for reagents or sample tubes, comprises the steps of:

providing a conductive base plate, which is arranged horizontally, and a sensor with a measurement electrode, which is arranged vertically, and a sensor electronic unit, which is connected to the measurement electrode and the base plate;

arranging a liquid container or a carrier unit having at least one receptacle for accommodating a liquid container, in particular a sample tube, on the base plate next to the measurement electrode;

exciting the measurement electrode with a signal;

determining a measurement signal depending on a capacitance (or impedance) between the measurement electrode and the base plate; and determining or recognizing, based on the measurement signal, at least one from the following list:
  a filling level of the liquid container, in particular of the sample tube, in particular whether the liquid container, in particular the sample tube, is empty and/or exceeds or is below a predetermined filling level;
  whether a liquid container, in particular a sample tube, is present in the at least one receptacle;
  which type of sample tube is located in a particular receptacle of the carrier unit;
  different characteristics on a carrier unit, such as individual receptacles, in particular partitions between the receptacles;
  what kind of carrier unit it is, such as a carrier unit adapted to receive sample tubes of a certain size or maximum filling capacity;
  controlling the optical recognition unit based on the measurement signal, in particular triggering a process for recognizing identifiers on and/or characteristics of the liquid container, in particular a sample tube, and/or of a reagent or sample located therein.

In an embodiment the method further comprises the step of:

moving a carrier unit with a plurality of receptacles for accommodating sample tubes in a horizontal direction past the measurement electrode, wherein the determination of the measurement signal is carried out while moving the carrier unit past the measurement electrode.

In another embodiment of the method, which allows to determine a presence of foam in the liquid container, the method further comprises the steps:

generating the signal for exciting the measuring electrode with a first frequency, in particular in a range from 1 kHz to 1 MHz, more particularly in a range from 300 kHz to 500 kHz;

generating the signal for exciting the measuring electrode with a second frequency, in particular in a range from 1 MHz to 50 MHz, more particularly in a range from 10 MHz to 15 MHz, wherein the first and second frequency are different; and outputting an identifier indicating a presence of foam in the liquid container, in particular in a sample tube, if a difference between the measuring signal when exciting the measuring electrode with the first frequency and the measuring signal when exciting the measuring electrode with the second frequency exceeds a predetermined threshold value.

Thereby, the signals for exciting the measurement electrode can be simultaneously generated at the first and second frequency and applied to the measurement electrode.

In another embodiment of the method, which allows to determine the presence of a particular liquid, in particular a particular reagent, in the liquid container, the method further comprises the steps:

generating the signal for exciting the measuring electrode with a first frequency, in particular in a range from 1 kHz to 1 MHz;

generating the signal for exciting the measuring electrode with a second frequency, in particular in a range from 1 MHz to 50 MHz, wherein the first and second frequencies are different; and outputting an identifier indicating a presence of a particular liquid, in particular a particular reagent, in the liquid container if a difference between the measuring signal when exciting the measuring electrode with the first frequency and the measuring signal when exciting the measuring electrode with the second frequency exceeds a predetermined threshold value.

Thereby, the signals for exciting the measurement electrode can be simultaneously generated at the first and second frequency and applied to the measurement electrode.

It should be noted that combinations of the above-mentioned embodiments are possible, which in turn lead to more specific embodiments of the present invention.

BRIEF DESCRIPTION OF THE DRAWINGS

Non-limiting exemplary embodiments of the present invention are explained in more detail below using figures, wherein:

FIG. 2 a) schematically shows in a side view a carrier unit with several sample tubes, FIG. 2 b) schematically shows in a view from above an embodiment of a device for capacitive filling level measurement in the sample tubes according to FIG. 2 a), FIG. 2 c) shows a schematic representation including an indication of the electrical equivalent circuit of the embodiment according to FIGS. 2 a) & b);

FIG. 3 a) shows a further embodiment of a sensor,

FIG. 3 b) shows a view of the front side (left) as well as the intermediate layer and the ground surface (right) of the sensor according to FIG. 3 a), FIG. 3 c) shows a side profile of the sensor according to FIGS. 3 a) & b) with the front side, the intermediate layer and behind it the layer with the ground surface;

In the figures the same reference signs stand for the same elements.

DETAILED DESCRIPTION OF THE INVENTION

Figure 1:
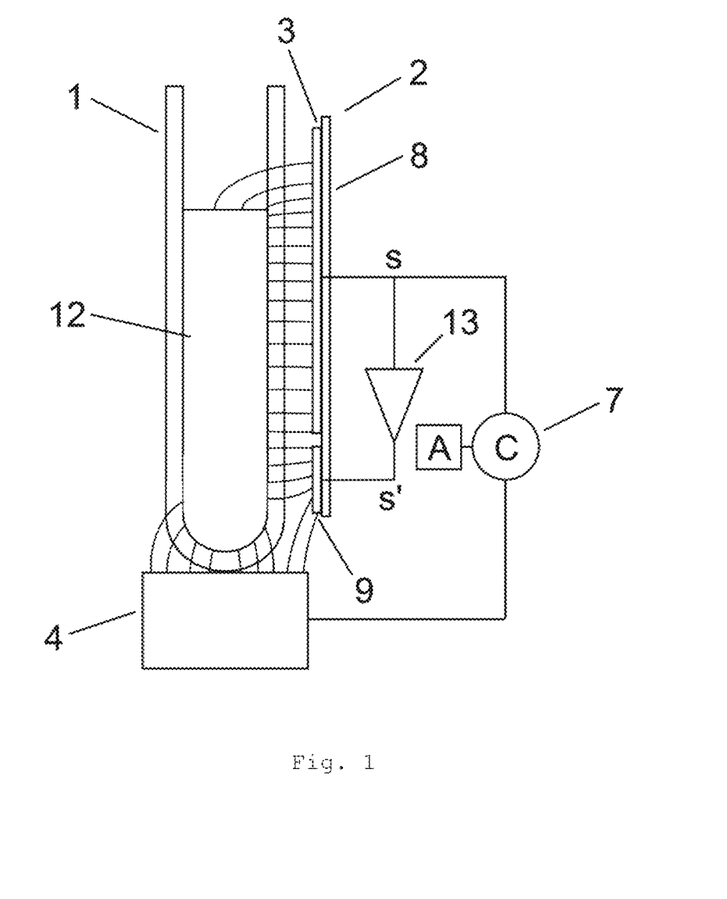
FIG. 1 schematically shows in a side view an embodiment of a device for capacitive filling level measurement.

FIG. 1 shows schematically in a side view an exemplary embodiment of an arrangement for capacitive filling level measurement. For this purpose, a liquid container, here a sample tube 1, is placed above a conductive, horizontal base plate (or working surface) 4 and next to a sensor 2 having a measurement electrode 3. The measurement electrode 3 and the base plate 4 are connected to a sensor electronic unit 7, which is adapted to determine the capacitance between the measurement electrode 3 and the base plate 4. Typically, the base plate 4 is grounded or is at a reference potential. To measure the capacitance, the measurement electrode 3 is excited with a signal s, which is generated by a signal generator in the sensor electronic unit 7. Due to the signal s, an electric field is formed between the measurement electrode 3 and the base plate 4, wherein the field lines pass through the liquid 12. Depending on the amount of liquid 12 in the sample tube 1, i.e. depending on the filling level, the measured capacitance changes.

Optionally, the sensor 2 can include a guard electrode 9 in addition to the measurement electrode 3, which is arranged on a sensor carrier 8 together with the measurement electrode 3. The guard electrode 9 is excited with a low-impedance signal s', which can be generated by applying the signal s to a buffer amplifier 13 with voltage gain 1. By means of the guard electrode 9 the electric field can be focused in a desired way, ensuring that the field lines from the measurement electrode 3 are guided through the liquid 12 and not directly into the base plate 4, which increases the accuracy of the filling level measurement.

The sensor 2 shown in FIG. 1 is well suited if in each case only a single liquid container, e.g. a trough or vial with a reagent or cleaning agent, is placed in front of the described electrode arrangement in order to determine its filling level. If, on the other hand, several liquid containers arranged close to each other, such as a large number of sample tubes 1 in a carrier unit (rack) 5, are passed together past the sensor 2, a part of the field lines from the measurement electrode 3 is passed through the liquid 12' of the adjacent sample tubes 1', whereby the measurement of the filling level of the desired sample tube 1 can be distorted by the filling level of the adjacent sample tubes 1'.

Figure 2:
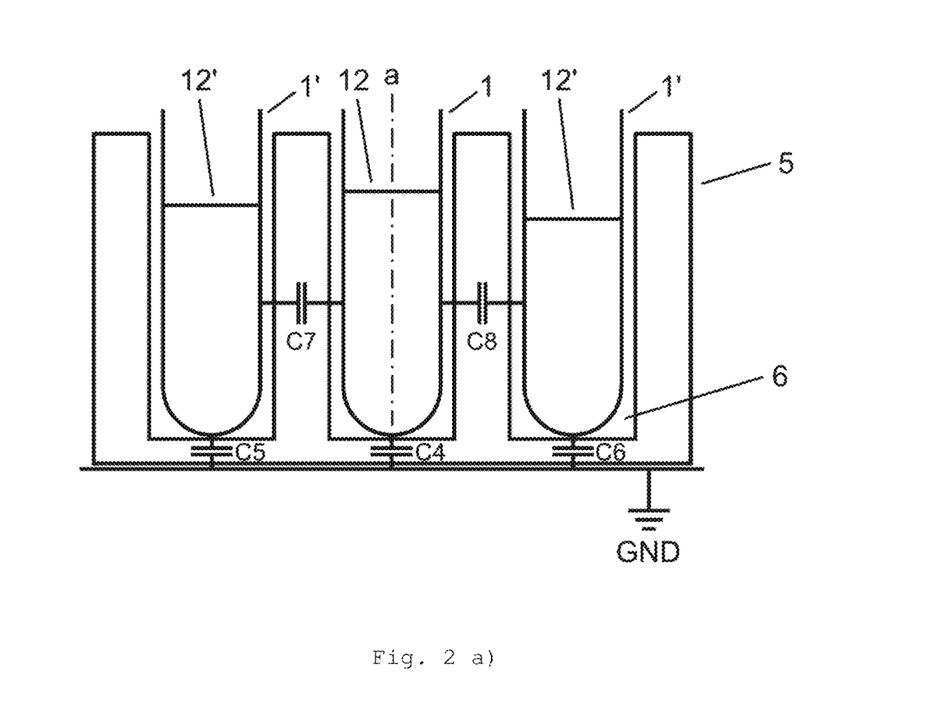

FIGS. 2 a), b) & c) show an embodiment of a sensor 2, which solves the problem described above by strongly reducing the "crosstalk" caused by adjacent sample tubes 1'.

FIG. 2 a) shows schematically in a side view a carrier unit 5 having several sample tubes 1, which all contain liquid 12, 12'. The sensor 2 is not visible in this illustration, but is located in front of the three sample tubes 1, 1' whose longitudinal axis a is perpendicular to the horizontal base plate 4. In FIG. 2 b) this arrangement is shown from above, here with the sensor 2. As indicated, the measurement electrode 3 of this sensor 2 is located between two guard electrodes 91, 92, which are arranged on the left and right of the measurement electrode 3. The measurement electrode 3 as well as the two guard electrodes 91, 92 are arranged on the front side V of a printed circuit board, which serves as sensor carrier 8. On the rear side H of the sensor carrier 8 a further guard electrode 93 is arranged, which covers both the measurement electrode 3 and the two front guard electrodes 91, 92 from the rear. This electrode arrangement creates an electric field, which on the one hand couples the measurement electrode 3 to the liquid 12 in the sample tube 1 in front of it (indicated by the capacitance C1) and couples the two lateral guard electrodes 91, 92 to the liquid 12' in the sample tubes 1' in front of them (indicated by the capacitances C2 & C3) and on the other hand couples the liquid 12, 12' in the three sample tubes 1, 1' to the grounded base plate 4 (indicated by the capacitances C4, C5 & C6). Despite the guard electrodes 91, 92, a small part of the electric field from the liquid 12' in the two side sample tubes 1' is still scattered into the liquid 12 in the middle sample tube 1, whose filling level is to be measured (indicated by the capacitances C7 & C8). However, the capacitances C7 & C8 are comparatively small compared to the capacitances C1+C4.

FIG. 2 c) shows a schematic representation including an indication of the electrical equivalent circuit of the embodiment according to FIGS. 2 a) & b) with the sensor electronic unit 7, which contains a signal generator that supplies the signal s for exciting the measurement electrode 3, as well as the buffer amplifier 13 with gain 1, which supplies this signal s as a low-impedance signal s' to the two guard electrodes 91, 92.

Figure 3:
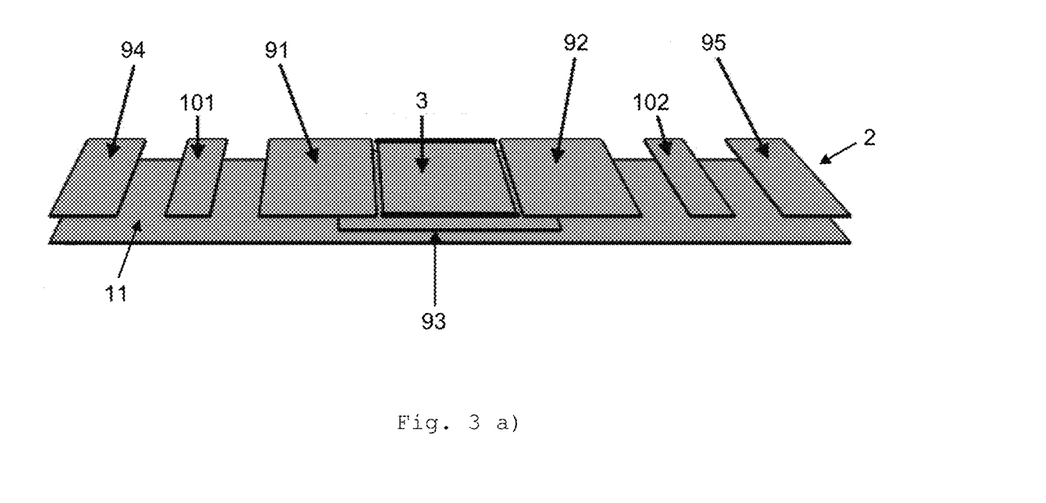

In order to further reduce the "crosstalk" or coupling of the sample tubes 1, 1' (or the liquids 12, 12' disposed in them), the embodiment illustrated in FIGS. 3 a), b) & c) is proposed.

FIG. 3 a) shows a striped section of sensor 2 in a perspective view. In this embodiment, an additional ground electrode 101, 102 and a further guard electrode 94, 95 are arranged on the front side V of the sensor carrier 8 to the left and right of the measurement electrode 3 and the two guard electrodes 91, 92. Due to the shown arrangement of the two lateral ground electrodes 101, 102, 1, 1', zeroes are generated in the electric field between the three sample tubes.

In the illustration of FIG. 3 b) the complete front side V of the sensor carrier 8 is shown in a view from the front on the left side with the left outer guard electrode 94, the left ground electrode 101, the left inner guard electrode 91, the measurement electrode 3, the right inner guard electrode 92, the right ground electrode 102 as well as the right outer guard electrode 95, which are all designed in a strip-shaped manner, in the middle the intermediate layer Z with the guard electrode 93, and on the right side the rear side H with the ground surface 11.

The length of the electrode strips corresponds approximately to the height of the sample tubes 1. As a detail, it should be noted that at the lower end of the measurement electrode 3 there is still a piece of guard electrode 9, as shown in FIG. 1, to ensure that the field lines of the electric field from the measurement electrode 3 reach the base plate 4 via the liquid 12 in the sample tube 1 and do not run directly from the measurement electrode 3 to the base plate 4 and bypass the liquid 12 in the sample tube 1, which would falsify the filling level measurement and thus make it inaccurate.

FIG. 3 c) also shows a side profile (rotated 90 degrees to the horizontal) of the multi-layer sensor carrier 2, which is designed, for example, as a multi-layer printed circuit board, with the front side V with the seven strip-shaped electrodes 94, 101, 91, 3, 92, 102 & 95, the intermediate layer Z with the wide strip-shaped guard electrode 93 and the rear side H with the even wider ground surface 11, which covers all electrode strips in front of it from behind.

Figure 4:
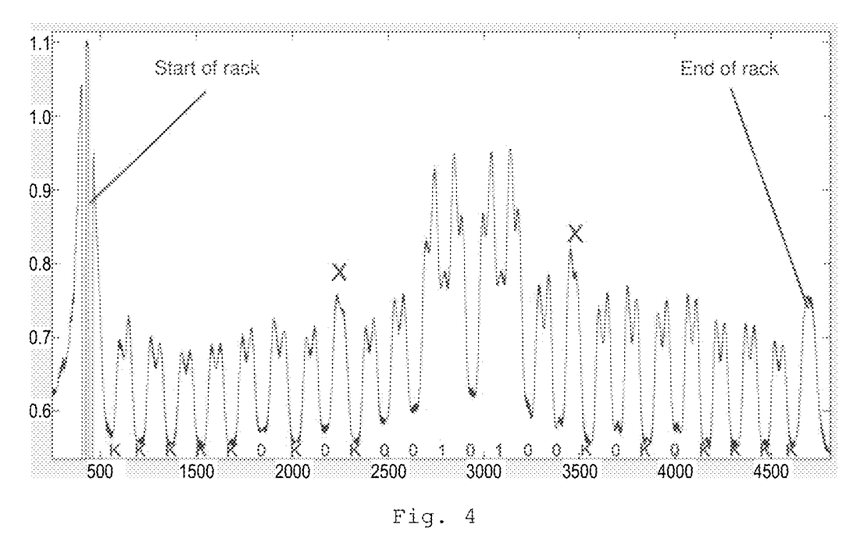
FIG. 4 shows a measured course of the capacitance over time when moving a carrier unit with sample tubes past the sensor according to FIGS. 3 a), b) & c)

In FIG. 4 the measured course of the capacitance over time when moving a carrier unit 5 with 24 receptacles 6 for sample tubes 1 past the sensor 2 according to FIGS. 3 a), b) & c) is shown. In the graph, the labels mean "K"=no sample tube in the receptacle, "0"=no liquid in the sample tube (empty), "1"=sample tube is full (with 6 ml of liquid 12). The measured curve shows peaks at the boundaries between the receptacles 6, and in particular at those places where parts of the carrier unit 5 are joined together, since there is a slightly wider boundary (see places marked with "X" in FIG. 4). The filling level of the sample tubes 1 can be derived from the height of the valleys between these peaks. It is also easily recognizable if there is no sample tube 1 in a receptacle 6 (see places marked with "K" in FIG. 4). The crosstalk is very low and maximally amounts to 10% of the base capacitance C1+C4. The extent of the crosstalk depends on the filling level of the two adjacent sample tubes 1'. If the filling level of the two adjacent sample tubes 1' is known (approximately), the crosstalk can be calculated/estimated and compensated.

Figure 5:
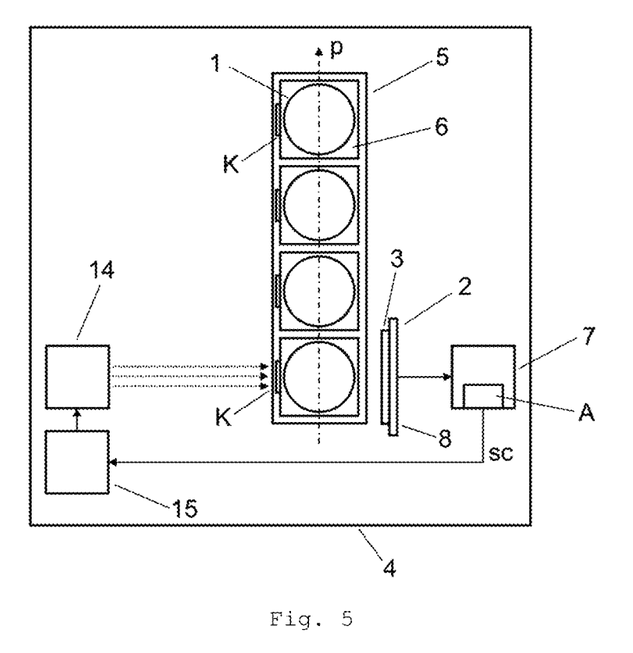
FIG. 5 schematically shows a further embodiment of a device for filling level measurement, which additionally features an optical recognition unit, which is controlled depending on the measured capacitance.

Finally, FIG. 5 schematically shows a further embodiment of a device for filling level measurement, which additionally has an optical recognition unit 14, which is controlled depending on the measured capacitance. The sample tubes 1 typically feature an identifier K, such as a one-(1D) or two-dimensional (2D) barcode, which is printed on a label affixed to the sample tube 1, so that e.g. information regarding the origin of the sample in sample tube 1 can be clearly assigned to it. Before processing the samples, the identifier K must be read on each sample tube 1 by means of the optical recognition unit 14. For this purpose, the optical recognition unit 14 must know when a sample tube 1 is arranged in front of it in order to read the identifier K. This information can for instance be supplied by an evaluation unit A in the sensor electronics unit 7, as soon as it determines that a sample tube 1 is in front of the sensor 2. As can be seen from FIG. 5, the carrier unit 5 with sample tubes 1 in the receptacles 6 is moved past the sensor 2 along the path p. As soon as the evaluation unit A has detected a certain characteristic at the carrier unit 5 or measured a specified minimum filling level, a control signal sc is generated, which signals to the control unit 15, which controls the optical recognition unit 14, that an identifier K should be read.

LIST OF REFERENCE SIGNS 1, 1' Liquid container, trough, sample tubes
2 Sensor
3 Measurement electrode
4 Base plate
5 Carrier unit
6 Receptacle
7 Sensor electronic unit
8 Sensor carrier (with front side V, rear side H, intermediate layer Z)
9 Guard electrode
91 First guard electrode
92 Second guard electrode
93 Third guard electrode
94 Fourth guard electrode
95 Fifth guard electrode
101 First ground electrode
102 Second ground electrode
11 Ground surface
12, 12' Liquid
13 Buffer amplifier
14 Optical recognition unit
15 Control unit
A Evaluation unit
a Longitudinal axis of a sample tube
C1 . . . C8 (Partial) capacitance GND Ground, ground potential
H Rear side of the sensor carrier
K Identifier
P Insertion path of the carrier unit
s Signal to excite the measurement electrode
s' Signal to excite the guard electrodes
sc Control signal
V Front side of the sensor carrier
Z Intermediate layer of the sensor carrier

The invention claimed is:

1. A device for controlling an optical recognition unit with the help of a capacitive filling level measurement in liquid containers (1), comprising:
    the optical recognition unit (14) with an optical sensor element;
    a sensor (2) having a measurement electrode (3);
    a conductive base plate (4) suitable for arranging at least one liquid container (1) or a carrier unit (5) having at least one receptacle (6) for receiving a liquid container (1);
    a sensor electronic unit (7) which is connected to the measurement electrode (3) and the conductive base plate (4) and is adapted to determine a capacitance between the measurement electrode (3) and the conductive base plate (4);
    an evaluation unit (A); and
    a control unit (15) for controlling the optical recognition unit (14),
        wherein the measurement electrode (3) is arranged substantially perpendicularly to the conductive base plate (4), and
        wherein the evaluation unit (A) is adapted to determine, based on the capacitance, at least one from the following list:
    a filling level of the liquid container (1) or whether the liquid container (1) is empty and/or exceeds or is below a predetermined filling level;
    whether a liquid container (1) is present in the at least one receptacle (6);
    different carrier units (5), such as carrier units (5) for differently sized liquid containers (1);
    different characteristics on a carrier unit (5), such as individual receptacles (6) or partitions between the receptacles (6),
        and wherein the control unit (15) is connected to the sensor electronics unit (7) or the evaluation unit (A), and a control signal (sc) can be generated by the sensor electronics unit (7) or the evaluation unit (A) depending on the capacitance, and the optical recognition unit (14) is controllable depending on the control signal (sc).

2. The device according to claim 1, wherein the measurement electrode (3) is arranged on a front side (V) of a sensor carrier (8) above a guard electrode (9).

3. The device according to claim 1, wherein the measurement electrode (3) is arranged on a front side (V) of a sensor carrier (8) between a first and a second guard electrode (91, 92).

4. The device according to claim 3, wherein a third guard electrode (93) is arranged on a rear side (H) or an intermediate layer (Z) of the sensor carrier (8), wherein the third guard electrode (93) covers at least the measurement electrode (3).

5. The device according to claim 4, wherein the measurement electrode (3) and the first and second guard electrode (91, 92) are arranged between a first and a second ground electrode (101, 102), and wherein the first and second ground electrode (101, 102) are arranged between a fourth and a fifth guard electrode (94, 95), wherein the first and second ground electrode (101, 102) are electrically connected with the conductive base plate (4).

6. The device according to claim 1, wherein the measurement electrode (3), the guard electrodes (91, 92, 93, 94, 95) and the ground electrodes (101, 102) are designed in the form of strips and are aligned vertically and parallel to a longitudinal axis (a) of the liquid container (1) during operation of the device.

7. The device according to claim 6, wherein the measuring electrode (3) has a width in the range from 80% to 100% of the diameter of the liquid container (1) and the first and second guard electrode (91,92).

8. The device according to claim 1, wherein the sensor electronics unit (7) comprises a signal generator with which a signal (s) for exciting the measuring electrode (3) can be generated.

9. The device according to claim 8, wherein the signal (s) for exciting the measuring electrode (3) is also used for exciting the guard electrodes (91, 92, 93, 94, 95), wherein the signal (s') for exciting the guard electrodes (91, 92, 93, 94, 95) is of low impedance.

10. The device according to claim 2, wherein the sensor carrier (8) is designed as a printed circuit board.

11. The device according to claim 10, wherein the sensor electronics unit (7) is located on the same printed circuit board as the sensor (2), wherein the printed circuit board has at least two intermediate layers (Z) between the front side (V) and the rear side (H), wherein the measuring electrode (3) and the first and second guard electrode (91, 92) as well as the first and second ground electrode (101, 102) as well as the fourth and fifth guard electrode (94, 95) are located on the front side (V) of the printed circuit board, the possible third guard electrode (93) is located on a first intermediate layer behind the front side (V), a ground surface (11) as shield is located on a second intermediate layer behind the first intermediate layer, wherein the shield is electrically connected with the first and second ground electrode (101, 102), and conductor tracks for signal conduction of the sensor electronics unit (7) are located on the rear side (H) and possibly on one or more further intermediate layers between the rear side (H) and the ground surface (11).

12. A method for controlling an optical recognition unit with the help of a capacitive filling level measurement in liquid containers (1), comprising the steps of:
    providing a conductive base plate (4), which is arranged horizontally, and a sensor (2) having a measurement electrode (3), which is arranged vertically, and a sensor electronic unit (7), which is connected to the measurement electrode (3) and the conductive base plate (4);
    arranging a liquid container (1) or a carrier unit (5) having at least one receptacle (6) for accommodating a liquid container (1) on the conductive base plate (4) next to the measurement electrode (3);
    exciting the measurement electrode (3) with a signal (s);
    determining a measurement signal depending on a capacitance between the measurement electrode (3) and the conductive base plate (4); and
    determining or recognizing, based on the measurement signal, at least one from the following list:
        a filling level of the liquid container (1) or whether the liquid container (1) is empty and/or exceeds or is below a predetermined filling level;
        whether a liquid container (1) is present in the at least one receptacle (6);

which type of sample tube (1) is located in a particular receptacle (6) of the carrier unit (5);

different characteristics on a carrier unit (5), such as individual receptacles (6) or partitions between the receptacles (6);

what kind of carrier unit (5) it is, such as a carrier unit (5) adapted to receive sample tubes (1) of a certain size or maximum filling capacity;

controlling the optical recognition unit (14) based on the measurement signal.

13. The method according to claim 12, further comprising the step of:

moving a carrier unit (5) with a plurality of receptacles (6) for accommodating sample tubes (1) in a horizontal direction past the measurement electrode (3), wherein the determination of the measurement signal is carried out while moving the carrier unit (5) past the measurement electrode (3).

14. The method according to claim 12, which allows to determine a presence of foam in the liquid container (1), further comprising the steps:

generating the signal for exciting the measuring electrode (3) with a first frequency;

generating the signal for exciting the measuring electrode (3) with a second frequency, wherein the first and second frequency are different; and outputting an identifier indicating a presence of foam in the liquid container (1) if a difference between the measuring signal when exciting the measuring electrode (3) with the first frequency and the measuring signal when exciting the measuring electrode (3) with the second frequency exceeds a predetermined threshold value.

15. The method according to claim 12, which allows to determine the presence of a certain one of a plurality of liquids (12) in the liquid container (1), further comprising the steps:

generating the signal for exciting the measuring electrode (3) with a first frequency;

generating the signal for exciting the measuring electrode (3) with a second frequency, wherein the first and second frequencies are different; and outputting an identifier indicating a presence of a certain one of a plurality of liquids (12) in the liquid container (1) if a difference between the measuring signal when exciting the measuring electrode (3) with the first frequency and the measuring signal when exciting the measuring electrode (3) with the second frequency exceeds a predetermined threshold value.

16. The device according to claim 1, wherein the liquid containers (1) are containers for reagents or sample tubes.

17. The device according to claim 1, wherein the measurement electrode (3) is arranged vertically to the horizontally arranged conductive base plate (4).

18. The device according to claim 1, wherein depending on the control signal (sc) a process can be activated for recognizing identifiers (K) on and/or characteristics of the liquid container (1) and/or of a reagent or sample contained therein.

19. The method according to claim 12, wherein controlling the optical recognition unit (14) based on the measurement signal comprises triggering a process for recognizing identifiers (K) on and/or characteristics of the liquid container (1) and/or of a reagent or sample located therein.

* * * * *